(12) United States Patent
Katayama (10) Patent No.: US 6,523,357 B1
(45) Date of Patent: Feb. 25, 2003

(54) ABSORPTION REFRIGERATOR

(75) Inventor: Masatoshi Katayama, Kyoto (JP)

(73) Assignee: Takuma Co., Ltd. (JP)

(*) Notice: Subject to any disclaimer, the term of this patent is extended or adjusted under 35 U.S.C. 154(b) by 0 days.

(21) Appl. No.: 10/004,625

(22) Filed: Dec. 4, 2001

(51) Int. Cl.[7] ............................................... F25B 15/00
(52) U.S. Cl. ............................ 62/141; 62/112; 62/476
(58) Field of Search ........................... 62/101, 112, 141, 62/238.4, 238.3, 476, 479, 486

(56) References Cited

U.S. PATENT DOCUMENTS

| | | | | |
|---|---|---|---|---|
| 5,177,979 A | * | 1/1993 | Gianfrancesco | 62/335 |
| 5,295,371 A | * | 3/1994 | Oonou et al. | 62/476 |
| 5,927,086 A | * | 7/1999 | Suzuki et al. | 62/141 |
| 6,160,318 A | * | 12/2000 | Komura | 290/2 |

FOREIGN PATENT DOCUMENTS

| | | | | |
|---|---|---|---|---|
| JP | 3-59359 | * | 3/1991 | 62/101 |
| JP | 6-180162 | * | 6/1994 | 62/476 |

* cited by examiner

*Primary Examiner*—Denise L. Esquivel
*Assistant Examiner*—Melvin Jones
(74) *Attorney, Agent, or Firm*—Webb Ziesenhiem Logsdon Orkin & Hanson, P.C.

(57) ABSTRACT

An absorption refrigerator includes an evaporator having an evaporating heat exchanger pipe operable to evaporate refrigerant on an outer surface thereof so as to cool liquid to be cooled running in the pipe, an absorber containing absorbent liquid for absorbing the refrigerant evaporated at the evaporator, a regenerator for heating and concentrating the absorbent liquid supplied from the absorber by using heat source fluid and then supplying the concentrated absorbent liquid to the absorber, a condenser for condensing steam or vapor of refrigerant supplied from the regenerator and supplying the condensed refrigerant to the evaporator and an evaporator for evaporating the condensed water condensed at the condenser. The absorption refrigerator further includes absorbent liquid supplying means for supplying the absorbent liquid to the refrigerant present at the evaporator and refrigerant discharging means for discharging the refrigerant present at the evaporator to the regenerator.

10 Claims, 3 Drawing Sheets

ABSORPTION REFRIGERATOR

BACKGROUND OF THE INVENTION

1. Field of the Invention

The present invention relates to an absorption refrigerator including an evaporator having an evaporating heat exchanger pipe operable to evaporate refrigerant on an outer surface thereof so as to cool liquid to be cooled running in the pipe, an absorber containing absorbent liquid for absorbing the refrigerant evaporated at the evaporator, a regenerator for heating and concentrating the absorbent liquid supplied from the absorber by using heat source fluid, and a condenser for condensing steam or vapor of refrigerant supplied from the regenerator and supplying the condensed refrigerant to the evaporator.

2. Description of the Related Art

An absorption refrigerator of the above-noted type utilizes heat source fluid such as hot water heated by utilizing exhaust heat from other device, a plant, etc. As a plant utilizing exhaust heat, a co-generation system (to be referred to as "CGS" hereinafter) is known.

In general, a CGS including an absorption refrigerator is designed for obtaining power from an electric power generator rotatably driven by a gas turbine or an engine. The system is adapted for improving total system efficiency by supplying to the absorption refrigerator the heat source fluid which was obtained by recovering heat from the exhaust gas exhausted from an engine and jacket water of the engine.

Figure 3:
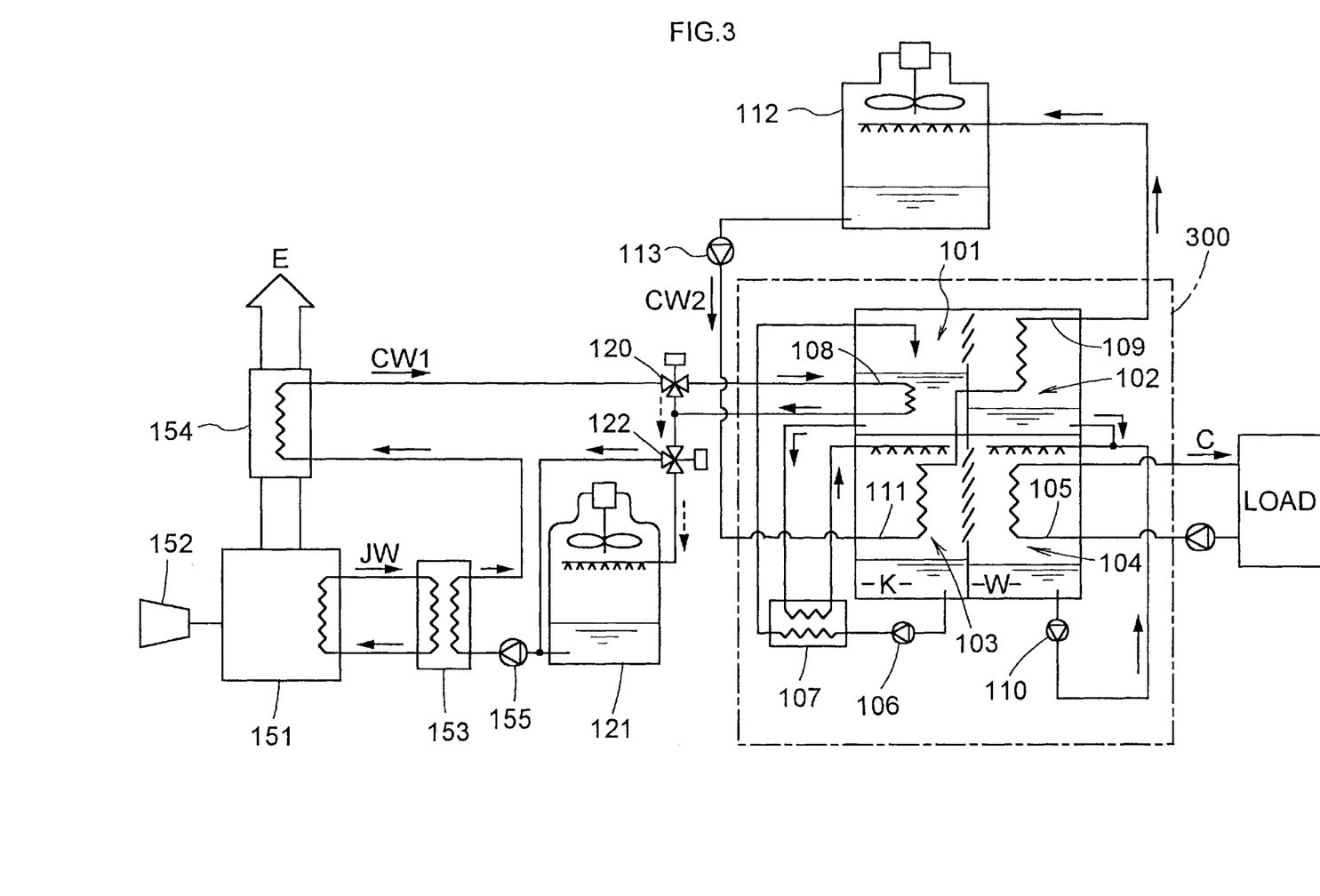
FIG. 3 is a construction diagram showing a schematic construction of a conventional absorption refrigerator.

As shown in FIG. 3, a hot water steam absorption refrigerator provided in the engine CGS utilizing engine exhaust heat is adapted for utilizing heat of jacket water JW and exhaust gas E of the engine 151 acting as a driving unit of an electric power generator 152. More particularly, the heat of the jacket water JW and the exhaust gas E is recovered by way of cooling water CW1 (an example of "heat source fluid") which is circulated by a circulator pump 155 between a jacket water heat exchanger 153 and an exhaust gas heat exchanger 154 and the resultant heated cooling water CW1 is supplied as hot water to a regenerator 101 to be described later.

At the hot water steam absorption refrigerator 300, with an absorbing action of absorbent liquid K which is lithium bromide solution contained at the absorber 103, this absorbent liquid K absorbs refrigerant W evaporated at the evaporator 104, whereby the inside of the evaporator 104 is depressurized. This promotes evaporation of the refrigerant water W on the surface of a evaporating heat exchanger pipe 105, which refrigerant water W is scattered or sprayed over the outer surface of the evaporating heat exchanger pipe 105 by means of a circulating pump 110 of the evaporator 104, so that latent heat of vaporization is absorbed from the refrigerant W, whereby the refrigerant water W and the cooling water C (an example of "liquid to be cooled") running in the evaporated heating pipe 105 mounted within the evaporator 104 are cooled.

At the absorber 103, as the absorbent liquid K absorbs the refrigerant W evaporated at the evaporator 104, the absorbent liquid K is diluted This diluted absorbent liquid K is supplied by a pump 106 via a low temperature heat exchanger passage 107 to the regenerator 101. The regenerator 101 circulates the cooling water CW heated by the exhaust heat of the engine 151 to a heating heat exchanger pipe 108, so that the diluted absorbent liquid K is heated to evaporate the refrigerant absorbed therein, whereby the liquid is regenerated. The absorbent liquid K concentrated at the regenerator 101 is returned to the absorber 103 via the low temperature heat exchanger 107. The low temperature heat exchanger 107 effects a heat exchange reaction between the absorbent liquid K heated at the regenerator 101 and the absorbent liquid K from the absorber 103, so that the absorbent liquid K supplied from the absorber 103 to the regenerator 101 is heated by the absorbent liquid K supplied from the regenerator 101 to the absorber 103.

The steam of the refrigerant W evaporated at the regenerator 101 is sent to the condenser 102, in which the steam is condensed by cooling water CW2 running in a cooling water heat exchanger pipe 109 mounted in the condenser 102. The condensed refrigerant water W is sent to the evaporator 104.

On the other hand, heat is discharged from the cooling water CW2 running in this cooling water heat exchanger pipe 109 of the condenser 102 at a cooling tower 112 as the water is being circulated by a pump 113. As this water runs through a cooling water heat exchanger pipe 111, the water is utilized for heat radiation at the absorber 3. Then, the water is supplied to the cooling water heat exchanger pipe 109 of the condenser 102.

Generally, the CGS is used for generation of electric power and recovery of heat. If the generation of electric power is its main purpose, it is expected that the load of electric power generation should be constant. Further, in case the chilled water C generated as a result of the heat recovery at the absorption refrigerator 300 is to be used for air cooling purpose, it is necessary to stop the absorption refrigerator 300 when the cooling load is small, since the cooling load varies according to the operating hour and the outside air temperature.

With some CGS's used for electric power generation, the engine 1 acting as the driving source of the electric generator must not or cannot be stopped. In such cases, in order to reduce the coolability of the evaporator 104 in response to reduction in the cooling load, an arrangement is made for preventing the cooling water CW1 from entering the regenerator 101 of the absorption refrigerator 300. However, in order to realize this, it is necessary to provide additional components including a hot-water three-way valve for causing the cooling water CW1 to bypass the regenerator 101, a radiation cooling tower 121 for the cooling water CW1 which has a high temperature as having bypassed the regenerator 101, and a further hot-water three-way valve 122 for supplying hot water to the radiation cooling tower 121. All these increase the costs of the system.

Similarly, in the case of a system using a turbine instead of the engine 151 and supplying exhaust gas from the turbine directly to the regenerator of the absorption refrigerator, if necessity arises to reduce the coolability of this absorption refrigerator in response to reduction in the cooling load, it is necessary to provide a three-way damper for bypassing the exhaust gas. And, as this exhaust gas has a high pressure, the gas may leak from seals of the damper even when it is fully closed. As a result, a small amount of exhaust gas may be inadvertently supplied to the shutdown regenerator of the absorption refrigerator, thus inviting temperature rise in the regenerator as well as low temperature corrosion of the same.

Moreover, if the engine or turbine is stopped and started repeatedly without using such components as the exhaust gas three-way damper, hot-water three-way valve, the blades of the turbine or the piston of the engine may be damaged by heat shock. Finally, the shutdown of the engine or turbine disables the electric power generation needed.

In view of the above, there has been proposed an absorption refrigerator which prevents shutdown of the engine due to rise in the engine cooling temperature when the absorption refrigerator is stopped (Japanese patent application laid-open No. Hei. 5-196319). In the case of this absorption refrigerator, the hot-water three-way valve for recovering exhaust heat is not provided. And, when the cooling temperature drops due to reduction in the cooling load, the engine is not shut down. Instead, a pump for absorbent liquid of the absorption refrigerator is shut down, thereby to stop heat input to the absorption refrigerator even when hot water is supplied to the regenerator. And, by supplying refrigerant water into a pipe extending from the regenerator holding the concentrated absorbent liquid therein to the absorber, the absorbent liquid is diluted for preventing crystallization inside the pipe and also the hot-water three-way valve for causing hot water to bypass the regenerator can be omitted. However, if the absorption refrigerator is stopped and the refrigerant water is introduced in the pipe, the concentrated absorbent liquid remaining in the pipe will be pushed out into the absorber to be distributed over the cooling water heat exchanger pipe therein, whereby the pressure in this absorber will be further reduced. Moreover, although the refrigerant water at the evaporator hardly moves in the above process, a portion of this refrigerant water will be evaporated to cause temperature drop therein. As a result, there is the possibility that this refrigerant may be frozen inside the evaporator to block up the pipe. Therefore, when the refrigerator is started again later, there will likely occur the trouble that the refrigerant water will not flow because of the blockage. Further, although the above construction can omit the hot-water three-way valve, the construction requires instead a radiation cooling tower, since heat is not radiated from the hot water. Hence, with this conventional construction, substantial reduction in the system cost is not possible, either.

SUMMARY OF THE INVENTION

In view of the above-described state of the art, a primary object of the present invention is to provide an absorption refiigerator having a regenerator for directly introducing exhaust gas or hot water with improvement which allows uninterrupted operation of an engine or a turbine from which heat is recovered via heat source fluid even when shutdown of the refrigerator becomes necessary to cope with reduction in cooling load.

For accomplishing the above-noted object, the absorption refrigerator according to the present invention comprises absorbent liquid supplying means capable of supplying the absorbent liquid to the refrigerant present at the evaporator and refrigerant discharging means capable of discharging the refrigerant present at the evaporator to the regenerator.

With the above feature of the present invention, the absorbent liquid supplying means supplies the absorbent liquid to the refrigerant present at the evaporator, thereby to elevate the boiling point of the refrigerant at the evaporator. As a result, evaporation of the refrigerant on the outer surface of the evaporating heat exchanger pipe of the evaporator may be restricted, so that the refrigerator is capable of low load operation with reduced coolability for cooling water (liquid to be cooled). Moreover, due to the provision of the refrigerant discharging means, the refrigerant which has been supplied with the absorbent liquid at the evaporator may be discharged either directly to the regenerator or indirectly thereto via the absorber. Then, the refrigerant containing the absorbent liquid may be evaporated at the regenerator and the resultant refrigerant not containing the absorbent liquid may be supplied to the evaporator via the condenser. As a result, at the evaporator, the "purified" refrigerant may be evaporated on the outer surface of the evaporating heat exchanger pipe and then the refrigerator may resume its rated operation with the original coolability for the cooling water.

Accordingly, even if the absorption refrigerator is configured so that heat source fluid obtained by utilizing exhaust heat from an engine or a turbine is supplied to a regenerator, when there occurs drop in the temperature of the cooling water entering the evaporating heat exchanger pipe or when it becomes unnecessary to cool the cooling water, the refrigerator can provide reduced coolability of the cooling water without suspending the supply of the heat source fluid.

Preferably, the absorption refrigerator having the above construction further comprises a temperature sensor for detecting temperature of the liquid to be cooled exiting from the evaporating heat exchanger pipe and controlling means operable to switch over the coolability of the evaporator for the liquid to be cooled by selectively activating the absorbent liquid supplying means and the refrigerant discharging means based on the temperature detected by the temperature sensor.

With the above construction, a temperature sensor is provided for detecting a temperature of the cooling water exiting from the evaporating heat exchanger pipe, and based on the temperature detected by this temperature sensor, the absorbent liquid supplying means and the refrigerant discharging means are activated selectively, so that the coolability for the cooling water may be automatically switched over according to the temperature of the cooling water exiting from the evaporating heat exchanger pipe.

Hence, the absorption refrigerator with this feature provides automatic switchover of the coolability according to temperature variation of the cooling water supplied to the evaporating heat exchanger pipe.

Still preferably, in the construction described above, the controlling means activates the absorbent liquid supplying means when the detected temperature of the temperature sensor is below a predetermined temperature for supplying the absorbent liquid to the refrigerant at the evaporator, thereby to provide a low load operation with reduced coolability, whereas the controlling means activates the refrigerant discharging means when the detected temperature of the temperature sensor is above a predetermined temperature for discharging the refrigerant at the evaporator either directly to the regenerator or indirectly thereto via the absorber, thereby to provide a rated operation with larger coolability.

With the above feature, when it becomes necessary to reduce the coolability of the evaporator as the temperature of the cooling water exiting from the evaporating heat exchanger pipe drops below a predetermined temperature or the cooling load decreases, the controlling means activates the absorbent liquid supplying means for supplying the absorbent liquid to the refrigerant at the evaporator. As a result, the concentration of the refrigerant at the evaporator is increased to provide a higher boiling point, whereby evaporation of this refrigerant at the evaporator is restricted and the low load operation with reduced coolability for the cooling water becomes possible.

Also, from the above-described condition, when the temperature of the cooling water exiting from the evaporating heat exchanger pipe exceeds the predetermined temperature, it becomes necessary to return the coolability back to the normal rated operation. To realize this, the controlling means activates the refrigerant discharging means for discharging the refrigerant supplemented with the absorbent liquid at the evaporator either directly to the regenerator or indirectly to it via the absorber. As a result, this refrigerant may be evaporated at the regenerator and the resultant purified refrigerant free from the absorbent liquid may be supplied to the evaporator via the condenser, whereby the normal rated operation becomes possible in which the refrigerant with the reduced boiling point is evaporated at the evaporator for cooling the cooling water sufficiently.

Still preferably, in the construction having any one of the features described above, the absorption refrigerator is capable of freely varying the circulation amount of the absorbent liquid from the absorber to the regenerator, and for effecting the low load operation, the controlling means increases the circulation amount of the absorbent liquid.

With the absorption refrigerator described above, in order to effect the low load operation with reduced coolability of the evaporator, the absorbent liquid of the absorber is supplied to the evaporator for restricting evaporation at the evaporator. Hence, the absorbing action at the absorber too is restricted. As a result, evaporation of the refrigerant at the regenerator is restricted. Therefore, the radiation of the heat source fluid supplied to the regenerator is effected via the absorbent liquid by means of the cooling water at the absorber. Then, when the low load operation is to be effected, as described above, it is preferred that the controlling means increase the circulation amount of the absorbent liquid between the absorber and the regenerator so as to promote heat radiation from the absorbent liquid to the cooling water. With this arrangement, it becomes possible to restrict overheating of the regenerator, thus eliminating the necessity of providing a cooling tower or the like for the purpose of radiation of the heat source fluid during the low load operation.

Still preferably, in the absorption refrigerator having any one of the features described above, the heat source fluid comprises fluid heated by utilizing exhaust heat from the electric power generating engine or the electric power generating turbine.

As described hereinbefore, the absorption refrigerator of the invention is capable of switching over the coolability between the low load operation and the rated operation without suspending the supply of the heat source fluid to the regenerator. Then, when this refrigerator is adapted for utilizing exhaust heat from the electric power generating turbine, the refrigerator can eliminate arrangement for suspending the engine or turbine operation or suspending the supply of the heat source fluid to the regenerator. Thus, the absorption refrigerator may be constructed economically and with a simple construction.

Still preferably, in the absorption refrigerator having any one of the features described above, the regenerator includes a high temperature regenerator for receiving the heat source fluid and then heating/concentrating the absorbent liquid supplied from the absorber and a low temperature regenerator for heating/concentrating the absorbent liquid concentrated at the high temperature regenerator by using, as a heat source, the refrigerant vapor generated at the high temperature regenerator.

With this construction, the absorption refrigerator of the invention can be constructed as a so-called "double-effect" absorption refrigerator having the high temperature regenerator and the low temperature regenerator. In a system capable of obtaining high temperature heat source fluid, its absorption refrigerator capable of sufficiently utilizing the heat and cooling the cooling water in an efficient manner too can take advantage of the features to vary the coolability.

Further and other features and advantages of the present invention will become apparent from the following description of preferred embodiments thereof with reference to the accompanying drawings.

DETAILED DESCRIPTION OF THE PREFERRED EMBODIMENTS

Preferred embodiments of the present invention will now be described in details with reference to the accompanying drawings.

Figure 1:
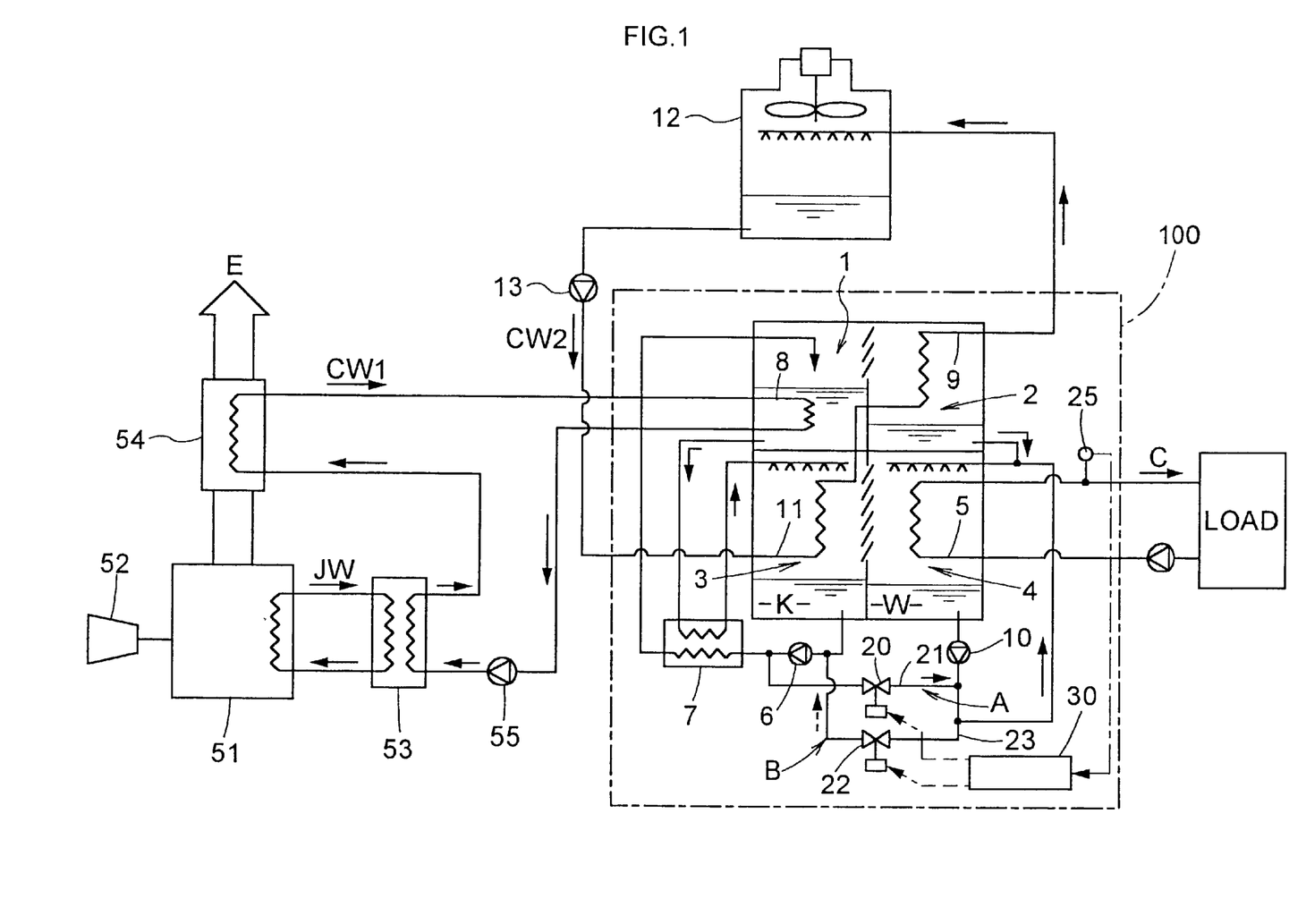
FIG. 1 is a construction diagram showing a schematic construction of an absorption refrigerator according to one preferred embodiment of the invention.

An absorption refrigerator 100 shown in FIG. 1 is constructed as a hot water steam absorption refrigerator incorporated in an engine CGS for utilizing exhaust heat of an engine. More particularly, the refrigerator is adapted for utilizing heat of a jacket water JW and heat of exhaust gas E of the engine 51 acting as a driving source of an electric power generator 52. In operation, the heat of the jacket water JW and the exhaust gas E is recovered through cooling water CW1 which is circulated between a jacket water heat exchanger 53 and an exhaust gas heat exchanger 54 by means of a circulator pump 55 and the resultant heated cooling water CW1 is supplied as hot or warm water (an example of "heat source fluid") to a regenerator 1 to be described later.

With this hot water steam absorption refrigerator 100, absorbent liquid K which is lithium bromide solution held at an absorber 3 absorbs refrigerant W evaporated at an evaporator 4 by an absorbing action of the absorbent liquid K, so that the inside of the evaporator 4 is depressurized and evaporation of the refrigerant W sprayed by a circulator pump 10 of the evaporator 4 on an outer surface of an evaporating heat exchanger pipe 5 is promoted. As latent heat of vaporization is absorbed from the refrigerant W, chilled water C (an example of "liquid to be cooled") circulating through the evaporating heat exchanger pipe 5 mounted inside the evaporator 4 is cooled.

The absorbent liquid K which has been diluted as having absorbed the refrigerant W at the absorber 3 is transported by a pump 6 via a low temperature heat exchanger passage 7 to the regenerator 1. This regenerator 1 circulates the cooling water CW heated by the exhaust gas of the engine 51 through a heating heat exchanger pipe 8 thereby to regenerate the diluted absorbent liquid K by heating and evaporating the refrigerant W absorbed therein. The resultant absorbent liquid K concentrated at the regenerator 1 is returned via the low temperature heat exchanger 7 to the absorber 3. The low temperature heat exchanger 7 effects a heat exchange reaction between the absorbent liquid K heated at the regenerator 1 and the absorbent liquid K from the absorber 3, so that the absorbent liquid K to be supplied from the absorber 3 to the regenerator 1 is heated with the absorbent liquid K supplied from the regenerator 1 to the absorber 3.

The steam of the refrigerant W evaporated at the regenerator 1 is sent to a condenser 2, in which the steam is condensed by a cooling water CW2 circulating through a cooling heat exchanger pipe 9 mounted within the condenser 2 and the condensed refrigerant water W is sent to the evaporator 4.

Further, the cooling water CW2 circulating through the cooling heat exchanger pipe 9 of this condenser 2 is circulated by a pump 13, which heat is radiated therefrom at a cooling tower 12 and then circulated through a cooling water heat exchanger pipe 11 mounted within the absorber 3 to be utilized for heat radiation at the absorber 3 and then supplied to the cooling water heat exchanger pipe 9 of the condenser 2.

The above-described construction is identical to that of the conventional absorption refrigerator. Next, the features of the present invention will be described.

The absorption refrigerator 100 according to the present invention further includes an absorbent liquid supplying means A capable of supplying the absorbent liquid K to the refrigerant W at the evaporator 4. This absorbent liquid supplying means A includes a pipe 21 for connecting the downstream side of the pump 6 for transporting the absorbent liquid K from the absorber 3 to the regenerator 1 and the downstream side of the circulator pump 10 for circulating the refrigerant of the evaporator 4 to be sprayed on the steam heat exchanger pipe 5 and a motor-driven valve 20 incorporated within the pipe 21. Then, by opening the motor-driven valve 20 by means of a control panel 30 (an example of "controlling means"), the absorbent liquid K supplied from the absorber 3 to the regenerator 1 may be supplied to the refrigerant W of the evaporator 4. With this absorbent liquid supplying means A, the absorbent liquid K is supplied to the refrigerant W of the evaporator 4, thereby to elevate the boiling point of the refrigerant W at the evaporator 4, so that the evaporation of the refrigerant W on the outer surface of the evaporating heat exchanger pipe 5 of the evaporator 4 may be restricted and a low load operation with reduced coolability of the chilled water C is made possible.

Further, the absorption refrigerator 100 of the invention includes a refrigerant discharging means B capable of discharging the refrigerant W present at the evaporator 4 to the regenerator 1. This refrigerant discharging means B includes a pipe 23 for connecting the downstream side of the circulator pump 10 for circulating the refrigerant at the evaporator 4 to be sprayed over the evaporating heat exchanger pipe 5 and the upstream side of the pump 6 for transporting the absorbent liquid K from the absorber 3 to the regenerator 1 and a motor-driven valve 22 incorporated within the pipe 23. In operation, by opening the motor-driven valve 22 by way of a control panel 30 (an example of "controlling means"), the refrigerant supplied with the absorbent liquid K of the evaporator 4 may be discharged to the regenerator 1. With this refrigerant discharging means B, in order to reduce the coolability as described above, the refrigerant W supplied with the absorbent liquid K is discharged to the regenerator 1, in which the refrigerant W is evaporated and the resultant purified refrigerant W may be supplied via the condenser 2 to the evaporator 4. At this evaporator 4, the pure refrigerant is evaporated on the outer surface of the evaporating heat exchanger pipe 5, so that the temporarily reduced cooling ability of the chilled water C may be restored to the rated operation.

Also, at the exit of the evaporating heat exchanger pipe 5, there is provided a temperature sensor 25 which detects the temperature of the chilled water C exiting from the evaporating heat exchanger pipe 5 and outputs the detected temperature to the control panel 30.

Based on the detected temperature of the chilled water C, the control panel 30 selectively activate the absorbent liquid supplying means A and the refrigerant discharging means B, thereby to automatically switch over the coolability of the chilled water C in accordance with the temperature of the chilled water C exiting from the evaporating heat exchanger pipe 5.

More particularly, when the detected temperature of the chilled water C exiting from the evaporating heat exchanger pipe 5 is below a predetermined temperature, the control panel 30 determines that the chilled water C need not be cooled any further at the evaporator 4, so that the control panel 30 activates the absorbent liquid supplying means A to supply the absorbent liquid K to the refrigerant W at the evaporator 4. With this, the concentration of the refrigerant at the evaporator 4 is raised with the supply of the additional absorbent liquid K thereto and the boiling point of the refrigerant is elevated correspondingly. Whereby the evaporation of the refrigerant at the evaporator 4 is restricted for effecting the low load operation with reduced coolability of the chilled water C. Then, from this condition, when the temperature of the chilled water C exiting from the evaporating heat exchanger pipe 5 exceeds the predetermined temperature, it becomes necessary to cool the chilled water C again. Therefore, the control panel 30 activates the refrigerant discharging means B this time so as to the refrigerant W added with the absorbent liquid K at the evaporator 4 to the regenerator 1, in which this refrigerant W is evaporated and the resultant purified refrigerant may be supplied via the condenser 2 to the evaporator 4. Then, at this evaporator 4, the refrigerant W with the reduced boiling point is evaporated, whereby the rated operation for sufficiently cooling the chilled water C is made possible.

With the above-described construction, when a low load operation with reduced coolability of the absorption refrigerator 100 is to be effected, it is not necessary to suspend the supply of the hot water to the regenerator 1 for recovery of exhaust heat of the engine 51 or to stop the engine 51 per se.

Further, during the low load operation with the reduced coolability of the evaporator 4, the absorbent liquid K of the absorber 3 is supplied to the evaporator 4 so as to restrict evaporation at this evaporator 4. Accordingly, the absorbing action at the absorber 3 is restricted and as a result the evaporation of the refrigerant at the regenerator 1 is restricted. Therefore, most of the heat radiation of the hot water supplied to the regenerator 1 takes place by way of the cooling water circulating through the cooling water heat exchanger pipe 11 at the absorber 3 via the absorbent liquid K. Thus, when the low load operation is effected in this manner, the control panel 30 increases the supply capacity of the pump 6 by using an inverter to increase the circulation amount of the absorbent liquid K at the absorber 3 and the regenerator 1, whereby the heat radiation from the absorbent liquid K to the cooling water CW2 may be promoted. Further, in this case, it is preferred that the circulation amount of the cooling water CW2 be increased also through adjustment of the pump 13.

Other embodiments of the absorption refrigerator relating to the present invention will be described next with reference to the accompanying drawings.

In the foregoing embodiment, an engine is employed as the driving source of the electric power generator. Instead, a turbine may be employed for driving the electric power generator. Still alternatively, instead of supplying hot water as heat source fluid to the regenerator, exhaust gas from the engine or the turbine may be supplied directly as the heat source.

Further, any other heat source than those using exhaust heat from a device other than an engine or a turbine can be utilized as the heat source of the regenerator(s).

In the foregoing embodiment, the absorption refrigerator of the invention is constructed as the so-called single effect type having one regenerator 1. Instead, this absorption refrigerator may be constructed as the double-effect type construction including a high temperature regenerator and a low temperature regenerator.

Figure 2:
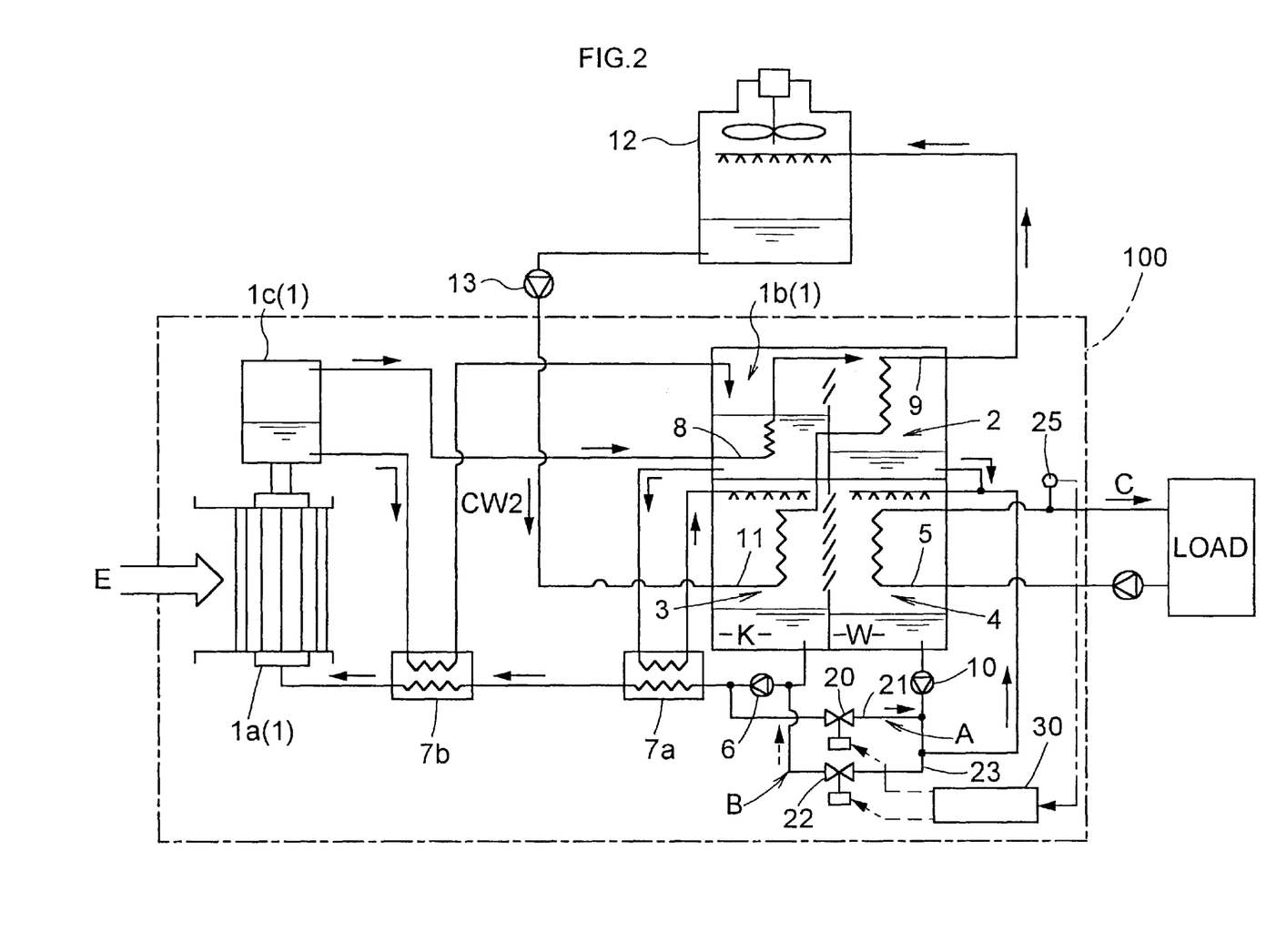
FIG. 2 is a construction diagram showing a schematic construction of an absorption refrigerator according to a further embodiment of the invention.

That is, as shown in FIG. 2, in this case, the regenerator 1 of the absorption refrigerator 100 consists of: a high temperature regenerator 1*a* which is supplied with the diluted absorbent liquid K via a low temperature heat exchanger 7*a* and a high temperature heat exchanger 7*b* and which then heats this diluted absorbent liquid K by directly utilizing exhaust gas E from an engine or a turbine as the heat source fluid; a separator 1*c* for separating the absorbent liquid K from the refrigerant W exiting from the high temperature regenerator 1*a*; and a low temperature regenerator 1*b* which is supplied, as the heat source, with the steam of the refrigerant W discharged from the separator 1*c* via the high temperature heat exchanger 7*a* and which then recovers heat from the absorbent liquid K. Then, the refrigerant W from which heat has been recovered at the low temperature regenerator 1*b* is condensed by the cooling water at the condenser 2 and then supplied to the evaporator 4. On the other hand, the absorbent liquid K which has been concentrated at the low temperature regenerator 1*b* is subjected to a heat recovery operation at the low temperature heat exchanger 7*a* and then supplied to the absorber 3. In contrast to the single-effect absorption refrigerator in which all of the heat of the steam of the refrigerant is radiated by the cooling water, the double-effect absorption refrigerator described above can utilize the steam of the refrigerant as the heat source of the low temperature regenerator 1*b*, so that a highly efficient operation is possible.

Such double-effect absorption refrigerator too can be constructed as the above-described absorption refrigerator of the present invention. That is, the refrigerator may be switched over to the low load operation with reduced coolability of the chilled water by activating the absorbent liquid supplying means A for supplying the absorbent liquid K to the refrigerant of the evaporator or to the rated operation with greater coolability by activating the refrigerant discharging means B for supplying the refrigerant at the evaporator to the high temperature regenerator 1*a*.

The present invention may be embodied in any other way than described above. Various modifications and changes will be apparent to those skilled in the art without departing from the essential features of the invention set forth in the appended claims.

What is claimed is:

1. An absorption refrigerator comprising:
   an evaporator having an evaporating heat exchanger pipe operable to evaporate refrigerant on an outer surface thereof so as to cool liquid to be cooled running in the pipe;
   an absorber containing absorbent liquid for absorbing the refrigerant evaporated at the evaporator;
   a regenerator for heating and concentrating the absorbent liquid supplied from the absorber by using heat source fluid and then supplying the concentrated absorbent liquid to the absorber;
   a condenser for condensing steam or vapor of refrigerant supplied from the regenerator and supplying the condensed refrigerant to the evaporator;
   said evaporator being operable for evaporating the condensed water condensed at the condenser;
   absorbent liquid supplying means for supplying the absorbent liquid having absorbed the refrigerant at the absorber to the refrigerant present at the evaporator; and
   refrigerant discharging means for discharging the refrigerant present at the evaporator to the regenerator.

2. The absorption refrigerator according to claim 1, further comprising:
   a temperature sensor for detecting temperature of the liquid to be cooled exiting from the evaporating heat exchanger pipe; and
   controlling means operable to switch over coolability of the evaporator for the liquid to be cooled by activating the absorbent liquid supplying means and the refrigerant discharging means based on the temperature detected by the temperature sensor.

3. The absorption refrigerator according to claim 2, wherein the controlling means activates the absorbent liquid supplying means when the detected temperature of the temperature sensor is below a predetermined temperature for supplying the absorbent liquid to the refrigerant at the evaporator, thereby to provide a low load operation with reduced coolability, whereas the controlling means activates the refrigerant discharging means when the detected temperature of the temperature sensor is above a predetermined temperature for discharging the refrigerant at the evaporator either to the regenerator or to the absorber, thereby to provide a rated operation with larger coolability.

4. The absorption refrigerator according to claim 3, wherein the absorption refrigerator is capable of freely varying the circulation amount of the absorbent liquid from the absorber to the regenerator, and for effecting the low load operation, the controlling means increases the circulation amount of the absorbent liquid.

5. The absorption refrigerator according to claim 1, wherein the heat source fluid comprises fluid heated by utilizing exhaust heat from the electric power generating engine or the electric power generating turbine.

6. The absorption refrigerator according to claim 1, wherein the regenerator includes a high temperature regenerator for receiving the heat source fluid and then heating/concentrating the absorbent liquid supplied from the absorber and a low temperature regenerator for heating/concentrating the absorbent liquid concentrated at the high temperature regenerator by using, as a heat source, the refrigerant vapor generated at the high temperature regenerator.

7. The absorption refrigerator according to claim 6, further comprising:
   a temperature sensor for detecting temperature of the liquid to be cooled exiting from the evaporating heat exchanger pipe; and
   controlling means operable to switch over coolability of the evaporator for the liquid to be cooled by activating the absorbent liquid supplying means and the refrigerant discharging means based on the temperature detected by the temperature sensor.

8. The absorption refrigerator according to claim 7, wherein the controlling means activates the absorbent liquid supplying means when the detected temperature of the temperature sensor is below a predetermined temperature for supplying the absorbent liquid to the refrigerant at the evaporator, thereby to provide a low load operation with reduced coolability, whereas the controlling means activates the refrigerant discharging means when the detected temperature of the temperature sensor is above a predetermined temperature for discharging the refrigerant at the evaporator either to the regenerator or to the absorber, thereby to provide a rated operation with larger coolability.

9. The absorption refrigerator according to claim 8, wherein the absorption refrigerator is capable of freely varying the circulation amount of the absorbent liquid from the absorber to the regenerator, and for effecting the low load operation, the controlling means increases the circulation amount of the absorbent liquid.

10. The absorption refrigerator according to claim 6, wherein the heat source fluid comprises fluid heated by utilizing exhaust heat from the electric power generating engine or the electric power generating turbine.

* * * * *

UNITED STATES PATENT AND TRADEMARK OFFICE
CERTIFICATE OF CORRECTION

PATENT NO.     : 6,523,357 B1                                     Page 1 of 1
DATED          : February 25, 2003
INVENTOR(S)    : Masatoshi Katayama It is certified that error appears in the above-identified patent and that said Letters Patent is hereby corrected as shown below:

<u>Column 1,</u>
Line 61, between "diluted" and "This" insert period -- . --.

Signed and Sealed this

Fifteenth Day of July, 2003

JAMES E. ROGAN
*Director of the United States Patent and Trademark Office*